US005213045A

United States Patent [19]

Gersemsky

[11] Patent Number: 5,213,045

[45] Date of Patent: May 25, 1993

[54] MONORAIL HOIST OR OVERHEAD CRANE HAVING A BOTTOM FLANGE RUNNING GEAR AND BOTTOM FLANGE RUNNING GEAR THEREFOR

[75] Inventor: Udo Gersemsky, Herdecke, Fed. Rep. of Germany

[73] Assignee: Mannesmann Aktiengesellschaft, Düsseldorf, Fed. Rep. of Germany

[21] Appl. No.: 854,716

[22] Filed: Mar. 23, 1992

[30] Foreign Application Priority Data

Mar. 22, 1991 [DE] Fed. Rep. of Germany ....... 4109971

[51] Int. Cl.[5] .......................... B66C 9/14; B60B 17/00

[52] U.S. Cl. ...................................... 104/93; 105/149; 105/150; 105/153

[58] Field of Search ................... 104/93, 89, 118, 119, 104/242, 245, 246, 247; 105/141, 148, 149, 150, 152, 153

[56] References Cited

U.S. PATENT DOCUMENTS 3,498,236 3/1970 Meek .................................. 105/153
3,518,947 7/1970 Borst .................................. 105/153
4,716,839 1/1988 Catena ................................ 105/153
5,069,141 12/1991 Ohara et al. ........................ 105/152

FOREIGN PATENT DOCUMENTS 0195477 2/1958 Fed. Rep. of Germany ...... 105/141
2225996 6/1990 United Kingdom ................. 104/93

*Primary Examiner*—Mark T. Le
*Attorney, Agent, or Firm*—Nils H. Ljungman and Associates

[57] ABSTRACT

A bottom flange running gear of a monorail has load-bearing running wheels on both sides of a preferably I-shaped running rail. Such a running gear has front and rear lateral guide rollers mounted on preferably vertical axles and in contact with the running rail. A preferably unilateral or one-sided load may be applied to the running gear, preferably by a traction motor. The invention proposes that at least one supporting roller carrier, preferably on the sidepiece of the running gear opposite the traction motor, can be linked coaxially to the axle of one of the guide rollers. The invention further proposes that a supplemental guide roller can be in contact, preferably under the force of a laterally positioned spring on the running rail, against the edge of the bottom flange of the running rail. Additionally, a supporting roller, mounted on a preferably horizontal supporting roller axle, may be in contact, from below, against the bottom flange of the running rail.

9 Claims, 4 Drawing Sheets

MONORAIL HOIST OR OVERHEAD CRANE HAVING A BOTTOM FLANGE RUNNING GEAR AND BOTTOM FLANGE RUNNING GEAR THEREFOR

BACKGROUND OF THE INVENTION

1. Field of the Invention

This invention relates to a bottom flange running gear of a monorail overhead hoist or crane, and more particularly, to a bottom flange running gear having load-bearing running wheels on both sides of an I-shaped running rail. Front and rear lateral guide rollers of the running gear are mounted on vertical axles and are in contact with the running rail. A unilateral or one-sided load is applied to the running gear by a traction motor. The I-shaped running rail can also be a box girder having bottom flanges projecting from the sides, which flanges can be used as running rails for the running wheels.

2. Background Information:

When the load supported by a crane or hoist oscillates, monorail bottom flange running gears having only one pair of running wheels tend to make nodding movements in the direction of travel. Likewise, when there is a transverse oscillation of the load, the running wheel on one side of such running gears is lifted up. This lifting is practically impossible to prevent when the running gear travels around curves. For cranes or overhead travelling cranes with large wheel bases and wide gauges or track widths, load oscillations do not affect the traction behavior of the crane in the same manner as they affect monorail running gears. One type of running gear is disclosed by German Laid Open Patent No. 36 27 358. To prevent nodding movements, the running gear can be connected by means of a beam or bar with an additional running gear. For crane carriages travelling on the top flange of a beam, guide rollers in contact with the top, bottom and side of the flange can prevent a lateral oscillation of the crane carriage. The traction motor located in the center of the beam does not cause any tilting moment on the crane carriage.

OBJECT OF THE INVENTION

The object of the invention is to improve a monorail overhead hoist bottom flange running gear so that nodding movements and lateral oscillation of the running gear can be prevented when the load suspended from the crane or hoist oscillates.

SUMMARY OF THE INVENTION

This object is achieved in that, at least on the sidepiece of the running gear opposite the traction motor, at least one supporting roller carrier is preferably linked coaxially to the axle of one of the guide rollers. In addition, on the end opposite the guide roller, the supporting roller carrier is preferably in lateral contact with the running rail by means of a supplemental guide roller mounted on a vertical axle, under the force of a spring. In the supporting roller carrier, a supporting roller, preferably in contact from below with the bottom flange of the running rail, is preferably mounted on a horizontal axle. The supplemental guide roller is generally always in contact with the running rail, even at different radii of curvature, as a result of the action of the spring. The bottom flange running gear is thereby correctly guided on the running rail even if the guide rollers permanently mounted on the bottom flange running gear have a slight play or clearance in relation to the running rail, so that there are no restrictions in the event of different rail widths.

The supporting roller mounted on the supporting roller carrier is preferably in contact with the bottom flange from below. This supporting roller typically prevents a tipping of one of the running wheels when the load oscillates against the tipping moment of the traction motor, which motor is supported by the supporting roller diagonally opposite the motor. The use of only one supporting roller generally allows the running gear to execute a nodding or tipping movement at the rail joint without resulting in jamming. When the running gear travels through curves, the supporting roller can generally be correctly guided by the geometric arrangement and causes no friction noises, which friction noises would be caused by axial friction components.

To increase stability, there are preferably two supporting roller carriers with supporting rollers and supplemental guide rollers on both ends of the sidepieces of the running gear. The springs used to link the supporting roller carrier are preferably coil springs which apply tension, and may have an anchor point in the opposite sidepiece of the running gear. The axle of the supporting roller is preferably vertical and is preferably located centrally between the axles of the guide rollers and, when the rails are curved, is generally always directed toward the center of the curve. Thus, the running gear can be correctly guided even when travelling through curves, generally does not produce any abrasion or friction, and generally does not generate any noise.

In an additional configuration of the invention, the supporting roller carrier can be mounted on an extension of the axle, and the height of the supporting roller carrier may be adjusted by means of adjusting nuts and screw threads for different flange thicknesses. The axle for the guide roller may also be guided by a guide groove, oriented preferably vertically in relation to the generally horizontal running rail, on the sidepiece of the running gear. The axle, contacting the sidepiece from below by means of a collar on the edge of the guide groove, can be clamped to the sidepiece of the running gear by means of a clamping screw. If there is reason to fear severe lateral oscillations of the load, both sidepieces of the running gear can preferably be equipped with flexibly coupled supporting roller carriers, preferably with guide rollers, wherein the guide rollers may include supplemental guide rollers and supporting guide rollers. The two sidepieces of the running gear can preferably be connected to one another underneath the running rail by means of an intermediate beam.

The running gear of the present invention, in spite of its simple construction, has excellent running characteristics during both curved and straight travel. The fact that the supporting roller runs along the bottom flange without grinding, means that both running wheels are generally always in contact with the bottom flange, even if the load oscillates. By maintaining essentially continuous contact between both running wheels and the bottom of the flange, one-half of the total wheel load of the powered wheel can be used for the frictional engagement. If the supporting rollers are preferably located on the sidepiece opposite the motor, and positioned infront of and behind the running wheels, the running wheels can generally be prevented from skewing, even with minimum play or clearance between the anchored guide rollers and the edge of the bottom flange. Preventing the running wheels from skewing means both reduced wear and quieter running.

One aspect of the invention resides broadly in movable hoist installation comprising:

a running rail wherein said rail comprises curved and straight portions;

said running rail comprising a top, a bottom, and at least two sides disposed between said top and said bottom;

a load bearing running wheel being disposed on said top of said running rail:

a motor means being connected to and for driving said load bearing running wheel;

said motor means being disposed on a first side of said running rail;

at least one supporting roller being disposed on at least one side of and displaced from said running wheel along the longitudinal direction of said running rail;

said at least one supporting roller being disposed along and making contact with said bottom of said running rail, on a second side having an edge wherein said second side is the side of said running rail opposite said first side; and a means for maintaining said at least one supporting roller at a minimum distance from said edge of said second side of said running rail when the center of the radius of curvature of said curved portion of said running rail is on the same side of said curved running rail as said motor means: and said minimum distance being no less than the distance from said edge of said second side along a straight portion of said running rail.

Another aspect of the invention resides broadly in a movable hoist for running on a running rail having a top, a bottom, and at least two sides disposed between the top and the bottom, wherein the at least two sides comprise a first side and a second side where the second side has an edge and is on the opposite side of the running rail as the first side, said hoist comprising:

a load bearing running wheel for running on a running rail comprising curved and straight portions:

a motor means being connected to and for driving said load bearing running wheel;

said motor means being disposed on a first side of the running rail;

at least two supporting rollers each for being disposed on each side of and displaced from said running wheel along the direction of the running rail;

said at least two supporting rollers for being disposed along the bottom of the second side of the running rail for making contact with the bottom of the running rail; and a means for maintaining said at least two supporting rollers at a minimum distance from the edge the second side of the running rail when the center of the radius of curvature of the curved portion of the running rail is on the same side of the curved running rail as said motor means; and said minimum distance being no less than the distance from the edge of the second side along a straight portion of the running rail.

Yet another aspect of the invention resides broadly in running gear for a monorail bottom flange hoist comprising:

a running rail comprising a top, a bottom, and at least two sides disposed between said top and said bottom:

said running rail comprising curved and straight portions;

a load bearing running wheel disposed on a first side of said running rail;

a motor means being connected to and for driving said load bearing running wheel;

said motor means also being disposed on said first side of the of the running rail;

at least one supporting roller, disposed on at least one supporting roller carrier, on at least one side of and displaced from said running wheel along the longitudinal direction of the running rail;

said at least one supporting roller, disposed in said at least one supporting roller carrier, being held in contact with said bottom of a second side of said running rail, wherein said second side is the side of said running rail opposite said first side;

a spring fastened to said at least one supporting roller carrier;

said at least one supporting roller carrier being held in contact with said second side of said running rail by said spring.

BRIEF DESCRIPTION OF THE DRAWINGS

One embodiment of the invention is explained below in greater detail and is illustrated in the accompanying drawings, in which.

DESCRIPTION OF THE PREFERRED EMBODIMENTS

Figure 1:
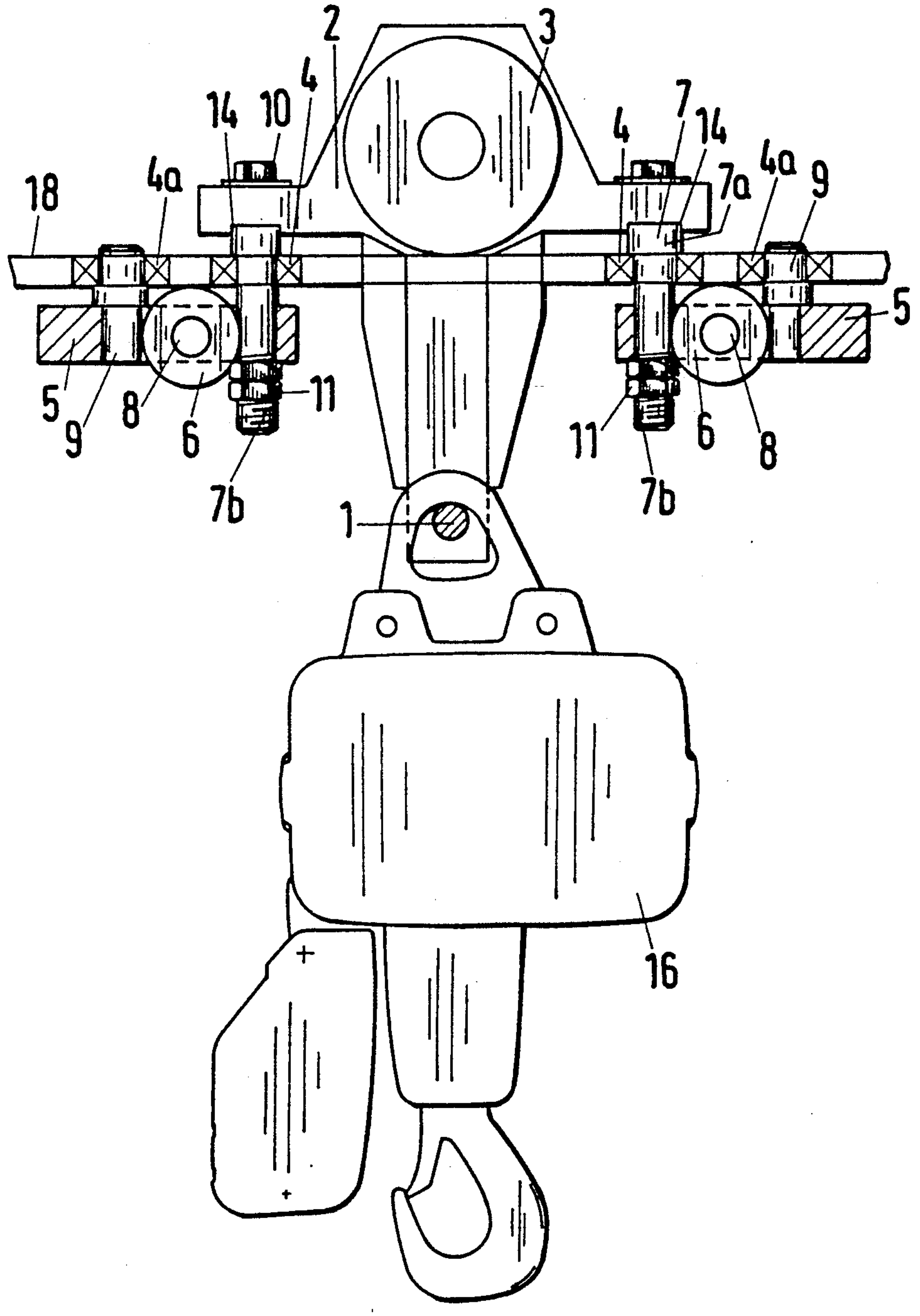
FIG. 1 shows a side view of a running gear.
Figure 2:
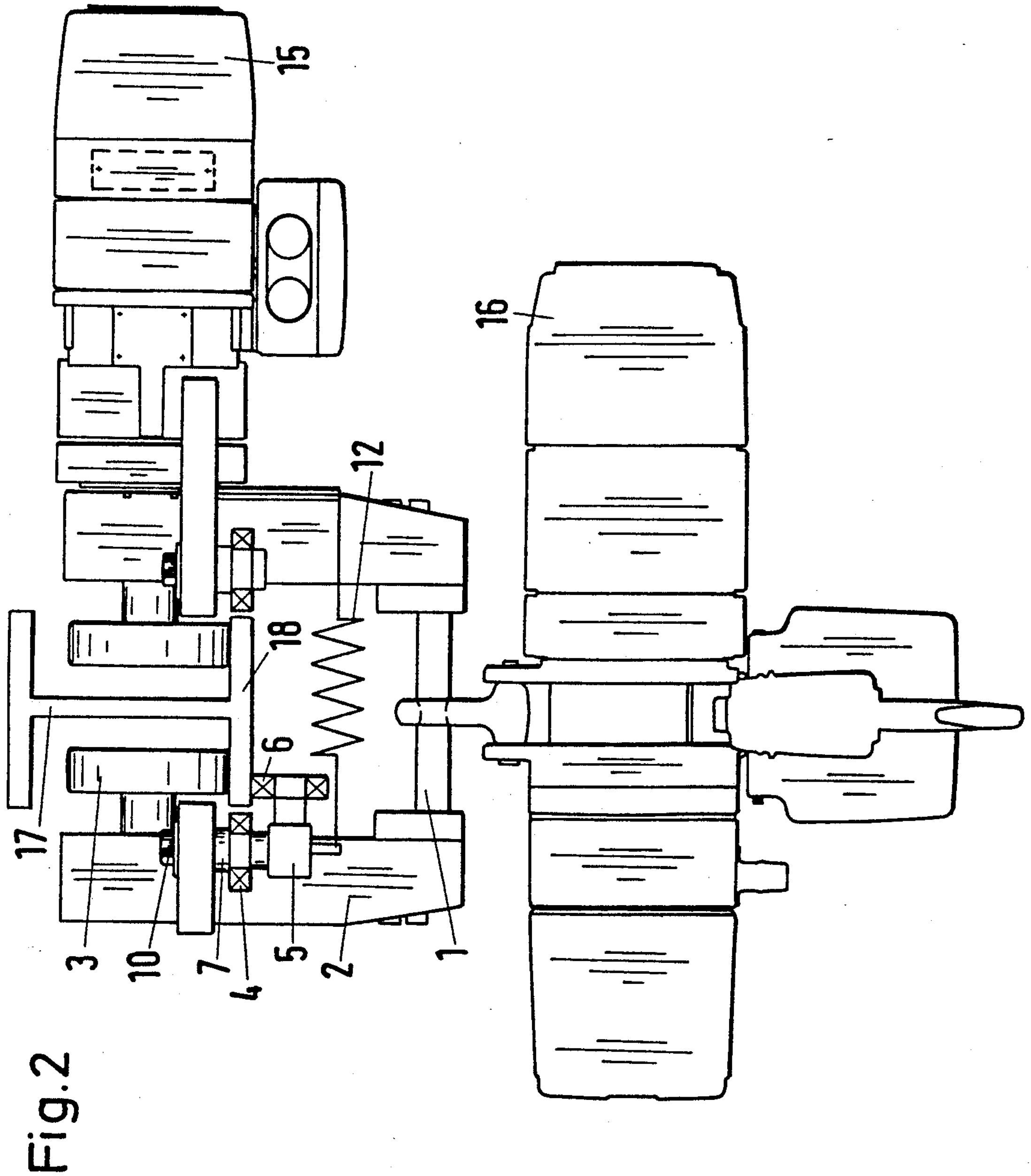
FIG. 2 shows an end view of a running gear.

The running gear in accordance with the present invention can move on a running rail which is a bottom flange 18 of a beam 17, and typically support a hoist or crane 16 on the intermediate beam 1. Sidepieces 2 of the running gear are fastened on both sides of the intermediate beam 1. Each of the sidepieces 2 preferably has at least one running wheel 3, and at least one of the running wheels 3 is preferably driven by a traction motor 15, or any other means for driving the running wheels. Each running gear sidepiece 2, preferably both in front of and behind the running wheel 3, can have a vertical axle 7 for supporting a guide roller 4 to roll laterally along the bottom flange 18. Each axle 7 can be moved in a guide groove 14 of the sidepiece 2 of the running gear perpendicular to the beam 17, and is in contact with a collar *7a* from underneath on the edge of the guide groove, and is secured in any desired width position by a clamping screw 10 screwed into an internal thread of the axle 7.

In other words, in one embodiment of the invention, the axle 7 can preferably be moved, within a guide groove 14 of the sidepiece 2 of the running gear, in a direction substantially perpendicular to the beam 17 to thereby alter the width spacing between axle 7 on one sidepiece 2 and the axle 7 on the other sidepiece 2. Each axle 7 is preferably in contact with a collar *7a*, which is disposed on an underlying edge of the guide groove 14. Each axle 7 can preferably be secured in any desired width position by clamping screw 10 screwed into an internal thread of the axle 7. Thus, this embodiment of the present invention provides a running gear which may be adjusted for running rails of different widths.

Figure 3:
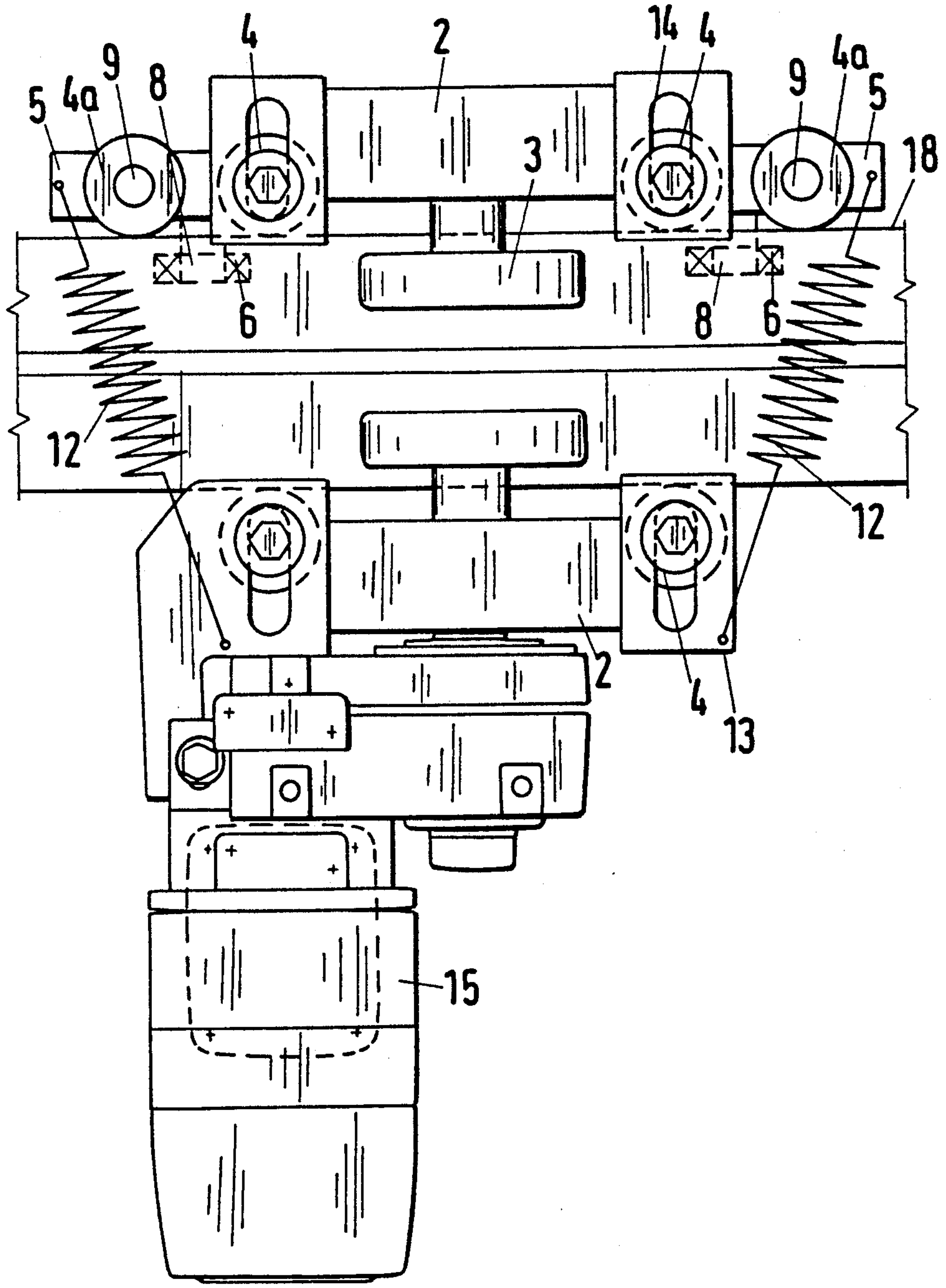
FIG. 3 shows a plan view of a running gear as illustrated in FIG. 1.

The guide roller 4 is preferably located underneath the collar 7*a* of axle 7, which axle 7 also preferably passes through a supporting roller carrier 5. The axle 7 preferably has a threaded portion 7*b* for receiving adjusting nuts 11, which nuts may be used to adjust the height of the supporting roller carrier 5 in relation to the axle 7 and the sidepieces 2. The supporting roller carrier 5 preferably has an additional vertical roller axle 9 for supporting a supplemental guide roller 4*a*, which supplemental guide roller preferably lies at approximately the same height as the other guide roller 4. Between the holes for the axles 7 and 9, the supporting roller carrier 5 can preferably have a hole for a horizontal supporting roller axle 8. On this roller axle 8, there is preferably a supporting roller 6. FIG. 3 shows that supplemental guide roller 4*a*, carried on supporting roller carrier 5, is generally maintained in contact with the edge of the bottom flange 18 by means of a spring 12, which can be in the form of a coil tension spring. The spring 12 may be anchored at a point 13 of the opposite running gear or sidepiece 2.

Figure 4:
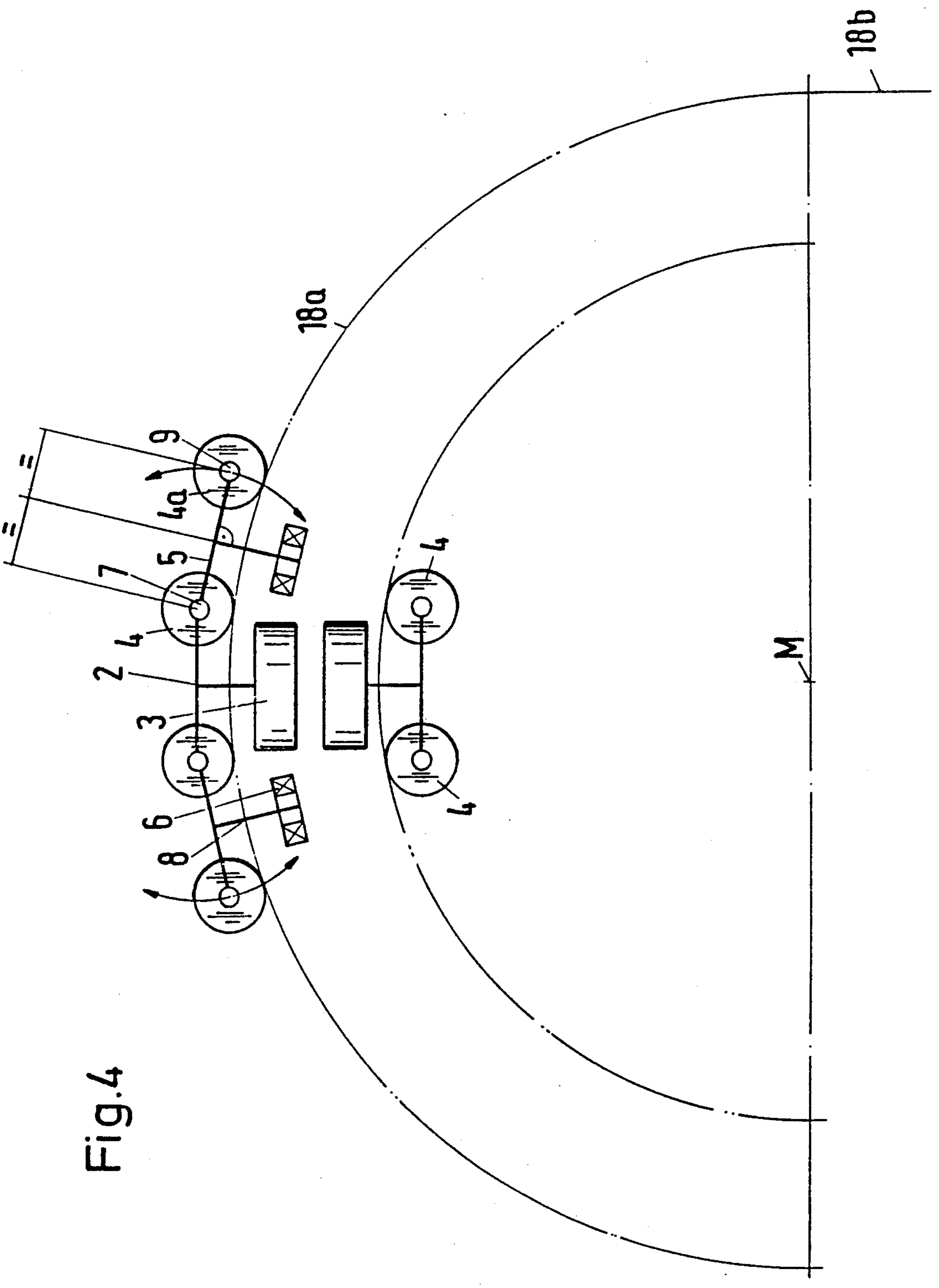
FIG. 4 shows a sketch of travel on a curve.

FIG. 4 shows clearly that the supporting roller axle 8 for the supporting roller 6, which roller is in contact with the bottom flange 18 including at least a curve portion 18*a* and at least a straight portion 18*b*, is preferably located in the center between the guide rollers 4 and 4*a*. When the running gear is travelling around a curve, the supporting roller carrier 5 is preferably pivoted on account of the spring tension, and this pivoting essentially allows the supporting roller axle 8 to be oriented directly toward the center M of the curve. Thus, the supporting rollers 6 can be correctly guided around the curve.

In further explanation of one embodiment of the present invention, supporting roller carrier 5 is preferably pivoted about axle 7, thereby allowing the running gear to travel on a curved running rail. In this embodiment, axle 8 of supporting roller 6 is preferably located at the midpoint between axles 7 and 9 of the lateral guide roller 4 and supplemental guide roller 4*a* respectively. Due to this configuration, axle 8 will generally always be directed towards the center of the curve. In other words, an extension of axle 8 would pass through both the center of the curve and the point at equal distances between axles 7 and 9. This implies that the supporting roller 6, mounted on axle 8, will preferably be oriented so as to roll in a direction which is substantially tangential to the path of the instantaneous movement of the running gear.

Still describing the above embodiment, the orientation of supporting roller 6, such that the roller 6 will roll in a direction which is tangential relative to the path of the instaneous movement of the running gear, poses a distinct advantage in preventing wear of the supporting roller 6. In a configuration where supporting roller 6 is directed in a direction other than the tangential direction, roller 6 will not undergo substantially frictionless rolling, but instead will be dragged along the underside of the bottom flange. Such dragging would result in unnecessary wear of the supporting roller 6.

Further still, in this embodiment, supporting roller 6 is preferably maintained at a minimum distance from the edge of the running rail. During travel in a straight path, the supporting roller 6 is preferably maintained at a generally constant minimum distance from the edge of the running rail. Additionally, during travel around a curved path, the pivoting action of the supporting roller carrier, as described above, enables the supporting roller 6 to be maintained at a distance even farther from the edge of the running gear than the minimum distance maintained from the edge of the running gear during travel in a straight path. This feature, wherein the supporting roller 6 is maintained at a minimum distance, provides greater stability during operation of the running gear. In a configuration where a minimum distance is not maintained between the edge of the running rail and supporting roller 6, such as during movement around a curve with a relatively small radius, as the supporting roller moves closer to the edge of the running rail and under conditions of extreme oscillation, the supporting roller may lift or slide off the running rail thereby causing the running gear to derail.

One feature of the invention resides broadly in a monorail bottom flange running gear with load-bearing running wheels on both sides of an I-shaped beam, whereby the front and rear lateral guide rollers, mounted on vertical axles, of a running gear are in contact with the running rail, and a unilateral or one-sided load is applied to the running gear by a traction motor, characterized by the fact that on at least the one running gear sidepiece 2 opposite the traction motor 15, at least one supporting roller carrier 5 is linked coaxially to the axle 7 of one of the guide rollers 4, and on the end opposite the guide roller 4, it is in contact under the force of a spring 12 laterally on the beam 17 with a supplemental guide roller 4*a* mounted on a vertical roller axis 9, and that in the supporting roller carrier 5, a supporting roller 6 in contact from below against the bottom flange 18 of the beam 17 is mounted on a horizontal supporting roller axle 8.

In other words, one feature of the invention resides broadly in a bottom flange running gear of a monorail, and more particularly, to a bottom flange running gear with load-bearing running wheels on both sides of an I-shaped beam. The front and rear lateral guide rollers of the running gear are preferably mounted on vertical axles and are generally in contact with the running rail. A unilateral or one-sided load can be applied to the running gear by a traction motor. At least one supporting roller carrier, on the running gear sidepiece 2 opposite the traction motor 15, may be preferably linked coaxially to the axle 7 of one of the guide rollers 4. The supplemental guide roller 4*a*, mounted on vertical roller axis 9 of roller carrier 5, is preferably held in contact with the edge of the bottom flange by the force of a tension device, such as a spring 12, positioned laterally across the beam 17. One end of the spring 12 may be fastened to the supporting roller carrier 5, on the end of the supporting roller carrier 5 opposite to the end with the guide roller 4, while the other end of this spring can be fastened to an anchor point 13 on the opposite sidepiece 2. A supporting roller 6, mounted on horizontal supporting roller axle 8 of roller carrier 5, is preferably in contact with the underside of bottom flange 18 of the beam 17.

Another feature of the invention resides broadly in a running gear, characterized by the fact that two supporting roller carriers 5 with supporting rollers 6 and supplemental guide rollers 4*a* are located on both ends of the sidepiece 2 of the running gear.

Yet another feature of the invention resides broadly in a running gear, characterized by the fact that the spring 12, which is a coil spring, applies tension between the pivoting end of the supporting roller carrier 5 and an anchor point 13 on the opposite sidepiece 2 of the running gear 4.

Still another feature of the invention resides broadly in a running gear, characterized by the fact that the supporting roller axle 8 is oriented vertically and centrally between the axles 7, 9 of the guide roller 4 and 4*a*. Thus, in one embodiment, the roller axle 8 is located centrally between parallel axles 7 and 9 of guide rollers 4 and 4*a*, and axle 8 lies in the plane perpendicular to the plane formed by axles 7 and 9.

Yet another feature of the invention resides broadly in a running gear, characterized by the fact that the supporting roller carrier 5 is mounted on an extension of the axle 7.

Another feature of the invention resides broadly in a running gear, characterized by the fact that the supporting roller carrier 5 is mounted so that its height can be adjusted by means of adjusting nuts 11 and threaded portions 7*b*.

Still another feature of the invention resides broadly in a running gear, characterized by the fact that the axle 7 is guided so that it can move in a guide groove 14 of the sidepiece 2 of the running gear and is oriented vertically in relation to the beam 17.

Another feature of the invention resides broadly in a running gear, characterized by the fact that the axle 7 is in contact from below by means of a collar 7*a* on the edge of the guide groove 14, and is clamped 10 on the sidepiece 2 of the running gear by means of a clamping screw.

Yet another feature of the invention resides broadly in a running gear, characterized by the fact that on both running gear sidepieces 2, there are supporting roller carriers 5 with supporting rollers and supplemental guide rollers 4*a*.

Another feature of the invention resides broadly in a running gear, characterized by the fact that the left and right sidepieces 2 of the running gear are connected to one another by means of an intermediate beam 1.

Some examples of monorail running gears or the like, which may be utilized with the embodiments of the present invention can be found in the following U.S. Patents: U.S. Pat. No. 4,541,769 to Clemens, entitled "Stacker crane fork mounting system"; U.S. Pat. No. 4,531,460 to Pamer, entitled "Material handling system"; U.S. Pat. No. 4,124,133 to Rosin et al., entitled "Molten metal delivery carrier"; U.S. Pat. No. 4,079,844 to Whitaker et al., entitled "Automated system for loading wood grinders"; U.S. Pat. No. 4,234,059 to Schaad, entitled "Breaking system for freight module on overhead guide rail"; U.S. Pat. No. 4,272,932 to Wappler, entitled "Telescopic boom"; and U.S. Pat. No. 4,074,220 to Petersen, entitled "Overhead monorail transit system employing carriage with upper guide wheel and guideway with concave upper surface".

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof, since modifications and variations thereof may be made without departing from the spirit and scope of the invention.

What is claimed is:

1. A movable hoist installation comprising:

a running rail wherein said rail comprises curved and straight portions said running rail being a bottom flange of a beam;

said running rail comprising a top, a bottom, and at least two sides disposed between said top and said bottom;

a load bearing running wheel being disposed on said bottom flange;

a motor means being connected to and for driving said load bearing running wheel;

said motor means being disposed on a first side of said running rail;

at least two supporting rollers each being disposed on each side of and displaced from said running wheel along the longitudinal direction of said running rail;

said at least two supporting rollers being disposed along and making contact with said bottom of said running rail, on a second side having an edge wherein said second side is the side of said running rail opposite said first side; and a means for maintaining said at least two supporting rollers at a minimum distance from said edge of said second side of said running rail when the center of the radius of curvature of said curved portion of said running rail is on the same side of said curved running rail as said motor means;

said minimum distance being no less than the distance of said at least two supporting rollers from said edge of said second side along a straight portion of said running rail;

said means for maintaining a minimum distance comprising means for moving the rotation axles of said at least two supporting rollers to maintain said minimum distance from said edge of said second aside of said running rail;

said means for maintaining said at least two supporting rollers at a minimum distance form said edge of said second side of said curved running rail comprising:

at least two supporting roller carriers; and biasing means for biasing said at least two supporting roller carriers against said edge of said second side of said running rail;

each said supporting roller carrier comprising:

a lateral guide roller being disposed along said edge of said second side of said running rail, ad said lateral guide roller being mounted on a lateral guide roller axle wherein said lateral guide roller axle is generally perpendicular to the bottom of said running rail; and a supplemental roller being disposed along said edge of said second side of said running rail, and said supplemental roller being mounted on a supplemental roller axle wherein said supplemental roller axle is generally perpendicular to the bottom of said running rail, and said supplemental roller axle is generally parallel to said lateral guide roller axle;

each said supporting roller being disposed along said bottom of said second side of said running rail, and each said supporting roller being mounted on a supporting roller axle, said supporting roller axle being disposed at a point between said lateral guide roller axle and said supplemental roller axle;

said supporting roller axle lying in the plane generally perpendicular to the plane formed by said lateral guide roller axle and said supplemental roller axle;

each said biasing means comprising a spring;

said spring pivoting one of said supporting roller carriers about said lateral guide roller axle and pressing said lateral guide roller and said supplemental roller against said second edge.

2. A movable hoist for running on a running rial having a top, a bottom, and at least two sides disposed between the top and the bottom, wherein the at least two sides comprise a first side and a second side where the second side has an edge and is on the opposite side of the running rail from the first side, said hoist comprising:

a load bearing running wheel for running on said running rail further comprising curved and straight portions;

a motor means being connected to and for driving said load bearing running wheel;

said motor means being disposed on the first side of the running rail;

at least two supporting rollers each being disposed on each side of and displaced from said running wheel along the longitudinal direction of the running rail;

said at least two supporting rollers for being disposed along the bottom of the second side of the running rail for making contact with the bottom of the running rail; and a means for maintaining said at least two supporting rollers at a minimum distance from the edge of the second side of the running rail when the center of the radius of curvature of a curved portion of the running rail is on the same side of the curved running rial as said motor means;

said minimum distance being no less than the distance of said supporting roller from the edge of the second side along a straight portion of the running rail;

said means for maintaining a minimum distance comprising means for moving the rotation axles of said at least two supporting rollers for maintaining said minimum distance from the edge of the second side of the running rail;

said means for maintaining said at least two supporting rollers at a minimum distance from the edge of the second side of the running rail comprising:

at least two supporting roller carriers; and biasing means for biasing said at least two supporting roller carriers against the edge of the second side of the running rail;

each said supporting roller carrier comprising:

a lateral guide roller being disposed along the edge of the second side of the running rail, and said lateral guide roller being mounted on a lateral guide roller axle wherein said lateral guide roller axle is generally perpendicular to the bottom of the running rail; and a supplemental roller being disposed along the edge of the second side of the running rail, and said supplemental roller being mounted on a supplemental roller axle wherein said supplemental role axle is generally perpendicular to the bottom of the running rail, and said supplemental roller axle is generally parallel to said lateral guide roller axle;

each said supporting roller being disposed along the bottom of the second side of the running rial, and each said supporting roller being mounted on a supporting roller axle, said supporting roller axle being disposed at a point between said lateral guide roller axle and said supplemental roller axle;

said supporting roller axle lying in the plane generally perpendicular to the plane formed by said lateral guide roller axle and said supplemental roller axle;

each said biasing means comprising a spring;

said spring pivoting one of said supporting roller carriers about said lateral guide roller axle for pressing said lateral guide roller and said supplemental roller against the second edge.

3. A running gear for a monorail bottom flange hoist comprising:

a running rail comprising a top, a bottom, and at least two sides disposed between said top and said bottom;

said running rial comprising curved and straight portions;

a load bearing running wheel disposed on the top near a first side of said running rail;

a motor means being connected to and for driving said load bearing running wheel;

said motor means also being disposed on said first side of the running rail;

at least one supporting roller, disposed on at least one supporting roller carrier, on at least one side of and displaced from said running wheel along the longitudinal direction of the running rial;

said at least one supporting roller, disposed on said at least one supporting roller carrier, being held in contact with said bottom of a second side of said running rail, wherein said second side is the side of said running rail opposite said first side;

a spring fastened to said at least one supporting roller carrier; and said at least one supporting roller carrier being biased toward said second side of said running rail by said spring.

4. The running gear of claim 3 including a running gear side piece being disposed on the second side of the running rail, said side piece having a lateral guide roller axle and wherein said supporting roller carrier comprises a first end and a second end being opposite each other;

said first end is coaxially linked to said lateral guide roller axle on said side piece and said second end is fastened to said spring;

a supplemental roller disposed in said supporting roller carrier, wherein said supplemental roller is mounted on a vertical guide roller axle;

at least one lateral guide roller mounted on said lateral guide roller axle; and a first of said at least one supporting roller being disposed in said supporting roller carrier, wherein said first supporting roller is in contact from below with said running rail and wherein said first supporting roller is mounted on a horizontal supporting roller axle.

5. The apparatus of claim 4 wherein:

said supporting roller carrier comprises height adjusting means for adjusting the height of said supporting roller carrier to accommodate different running rail thicknesses;

said height adjusting means comprises an adjusting nut and screw threads wherein said screw threads are disposed on an end of said lateral guide roller axle and said adjusting nut is disposed on said screw threads;

said lateral guide roller axle is guided by a guide groove of said side piece;

said guide groove comprises width adjusting means for adjusting the width of said supporting roller carrier to accomodate different running rail widths; and a collar is disposed on the underlying edge of said guide groove wherein said lateral guide roller axle passes through said collar.

6. The running gear according to claim 5 wherein said supporting roller carrier is mounted so that a height of said supporting roller carrier can be adjusted by means of said adjusting nut and said crew threads.

7. The running gear according to claim 6 wherein said lateral guide roller axle is in contact from below by means of said collar on the edge of said groove, and is clamped on said sidepiece of said running gear by means of a clamping screw.

8. The running gear according to claim 7 wherein said load bearing running wheel is mounted on a first portion of said running gear and said at least one supporting roller is mounted on a second portion of said running gear;

said at least one supporting roller carrier being disposed at said second portion of said running gear.

9. The running gear according to claim 8 wherein said both of said first and second portions of said running gear are connected to one another by means of an intermediate beam.

* * * * *

UNITED STATES PATENT AND TRADEMARK OFFICE

CERTIFICATE OF CORRECTION

PATENT NO. : 5,213,045

DATED : May 25, 1993

INVENTOR(S) : Udo GEREMSKY

It is certified that error appears in the above-indentified patent and that said Letters Patent is hereby corrected as shown below:

In column 7, line 51, after 'No.', delete "4,074,220" and insert --5,074,220--.

In column 8, line 33, Claim 1, before 'of', delete "aside" and insert --side--.

In column 8, line 35, Claim 1, after 'distance', delete "form" and insert --from--.

In column 8, line 44, Claim 1, after 'rail,', delete "ad" and insert --and--.

In column 9, lines 28-29, Claim 2, after 'running', delete "rial" and insert --rail--.

In column 9, line 55, Claim 2, after 'supplemental', delete "role" and insert --roller--.

In column 9, line 61, Claim 2, after 'running', delete 'rial' and insert --rail --.

UNITED STATES PATENT AND TRADEMARK OFFICE
CERTIFICATE OF CORRECTION

PATENT NO. : 5,213,045

DATED : May 25, 1993

INVENTOR(S) : Udo GERSEMSKY

It is certified that error appears in the above-indentified patent and that said Letters Patent is hereby corrected as shown below:

In column 10, line 11, Claim 3, after 'running', delete 'rial' and insert --rail--.

In column 10, line 22, Claim 3, after 'running', delete "rial;" and insert --rail;--.

In column 12, line 9, Claim 9, before 'both' delete the first occurrence of "said".

Signed and Sealed this

Sixth Day of May, 1997

Attest:

Attesting Officer

BRUCE LEHMAN

*Commissioner of Patents and Trademarks*